United States Patent
Pan et al.

(10) Patent No.: US 9,810,947 B2
(45) Date of Patent: Nov. 7, 2017

(54) LIQUID CRYSTAL BASED OPTOELECTRONIC DEVICE

(71) Applicant: NATIONAL TSING HUA UNIVERSITY, Hsinchu (TW)

(72) Inventors: Ci-Ling Pan, Hsinchu (TW); Chan-Shan Yang, Hsinchu (TW); Tsung-Ta Tang, Hsinchu (TW); Ru-Pin Pan, Hsinchu (TW); Pei-Chen Yu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 95 days.

(21) Appl. No.: 14/602,013

(22) Filed: Jan. 21, 2015

(65) Prior Publication Data
US 2015/0253627 A1   Sep. 10, 2015

(30) Foreign Application Priority Data
Mar. 10, 2014   (TW) .............................. 103108086 A

(51) Int. Cl.
*G02F 1/1337* (2006.01)
*G02F 1/1343* (2006.01)

(52) U.S. Cl.
CPC .... *G02F 1/133707* (2013.01); *G02F 1/13439* (2013.01)

(58) Field of Classification Search
CPC ................................................ G02F 1/133707
See application file for complete search history.

(56) References Cited

U.S. PATENT DOCUMENTS

| 2006/0208169 | A1* | 9/2006 | Breed ................... B60N 2/002 250/221 |
| 2008/0279750 | A1* | 11/2008 | Chik ................... B81C 1/00031 423/445 B |
| 2011/0128489 | A1 | 6/2011 | Cho et al. |
| 2013/0020113 | A1 | 1/2013 | Corbea et al. |
| 2013/0321753 | A1* | 12/2013 | Lu ..................... G02F 1/133707 349/139 |

FOREIGN PATENT DOCUMENTS

| TW | 201044601 | 12/2010 |
| TW | 201200907 | 1/2012 |

OTHER PUBLICATIONS

Chan-Shan Yang et al., "High-Transmittance Liquid-Crystal Tunable Terahertz Phase Shifter Using ovel Transparent Electrodes," Frontiers in Optics, Oct. 2013, 4 pages, OSA, US.

* cited by examiner

*Primary Examiner* — Bumsuk Won
*Assistant Examiner* — Jacob R Stern

(57) ABSTRACT

The invention provides a liquid crystal based optoelectronic device, including an upper substrate and a lower substrate, a liquid crystal layer sandwiched between the upper substrate and the lower substrate, and a pair of indium tin oxide nano-whisker layers formed on the inner surfaces of the upper substrate and the lower substrate, wherein the indium tin oxide nano-whisker layer is used as an alignment layer for aligning liquid crystal molecules in the liquid crystal layer.

8 Claims, 6 Drawing Sheets

US 9,810,947 B2

LIQUID CRYSTAL BASED OPTOELECTRONIC DEVICE

CROSS REFERENCE TO RELATED APPLICATIONS

This Application claims priority of Taiwan Patent Application No. 103108086, filed on Mar. 10, 2014, the entirety of which is incorporated by reference herein.

BACKGROUND OF THE INVENTION

Field of the Invention

The present invention relates to a liquid crystal based optoelectronic device, and in particular to a liquid crystal based optoelectronic device using indium-tin-oxide (ITO) nanomaterials as liquid crystal alignment layers and transparent electrodes.

Description of the Related Art

A conventional liquid crystal alignment method is to apply polyimide on a substrate and rub the substrate with a cloth roller. The contact-type alignment method described above usually has problems such as dust pollution, static electricity damage, brush defects, internal stress, etc. Thus, manufacturing processes for subtle high-precision elements usually avoid using this contact-type alignment method.

If a non-contact-type alignment method is utilized, a film evaporated by oblique evaporation can align liquid crystal molecules in a particular direction to avoid the problems of the contact-type alignment method. However, when those aligned liquid crystal molecules are applied to an optoelectronic device, transparent electrodes with high transmittance are usually required as well. Therefore, materials which are conductive and transparent, and have the ability to align liquid crystal molecules, will be helpful in the research and development of various kinds of optoelectronic techniques.

BRIEF SUMMARY OF THE INVENTION

A detailed description is given in the following embodiments with reference to the accompanying drawings.

To solve the problems, the invention provides a liquid crystal based optoelectronic device, including: an upper substrate and a lower substrate, a liquid crystal layer sandwiched between the upper substrate and the lower substrate, and a pair of indium-tin-oxide (ITO) nano-whisker layers formed on the inner surfaces of the upper substrate and the lower substrate, wherein the ITO nano-whisker layer is used as an alignment layer for aligning liquid crystal molecules in the liquid crystal layer.

In an embodiment of the invention, the ITO nano-whisker layer has a plurality of whiskers, and the plurality of whiskers extend in a first direction in the plane of the upper substrate or the lower substrate as a whole so as to align the liquid crystal molecules in a second direction which is perpendicular to the first direction.

In an embodiment of the invention, the ITO nano-whisker layer is used as a transparent electrode for driving the tilt direction of the liquid crystal molecules.

In an embodiment of the invention, the liquid crystal based optoelectronic device is utilized in the terahertz band (0.1~10 THz).

In an embodiment of the invention, the liquid crystal based optoelectronic device is utilized in the visible light band.

In an embodiment of the invention, the liquid crystal based optoelectronic device is utilized in a display apparatus.

In an embodiment of the invention, the thickness of the ITO nano-whisker layer is 600 nm~1400 nm.

In an embodiment of the invention, the ITO nano-whisker layer is formed by glancing angle deposition, wherein an angle between a vapor flux direction and the normal direction of the substrate where the vapor is deposited is 40°~80°.

According to the above embodiments, the invention provides a liquid crystal based optoelectronic device which uses an ITO nano-whisker structure as electrodes and alignment layers. The ITO nano-whisker structured electrode of the liquid crystal based optoelectronic device has the advantages of high transmittance and a low driving voltage. When the ITO nano-whisker structured electrode is used as an alignment layer at the same time, the shortcomings of contact-type alignment methods, such as dust pollution, static electricity damage, brush defects, internal stress, etc can be avoided. Therefore, the ITO nano-whisker structured electrode/alignment layer can be applied to subtle high-precision elements.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the embodiments of the invention. The same elements in different embodiments will be labeled with the same numerals. This description is made for the purpose of illustrating the general principles of the invention and should not be taken in a limiting sense. The scope of the invention is best determined by reference to the appended claims.

Figure 1A:
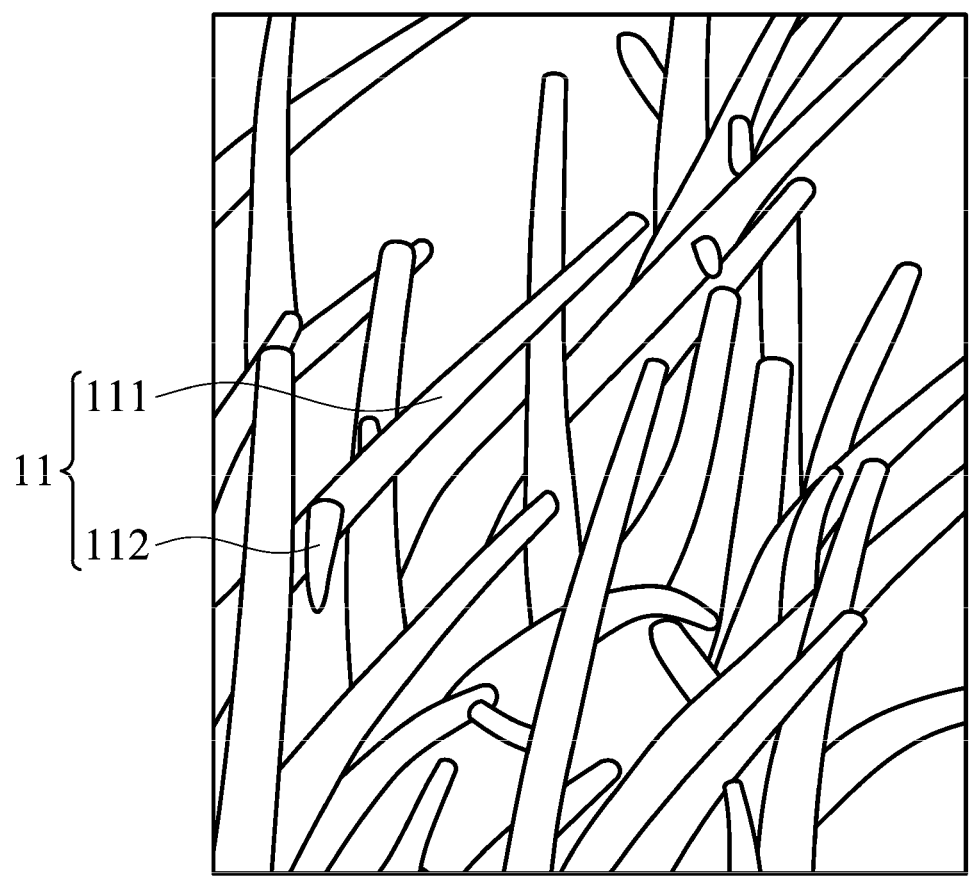
FIG. 1A is a perspective view of an ITO nano-whisker structure observed by an electron microscope.
Figure 1B:
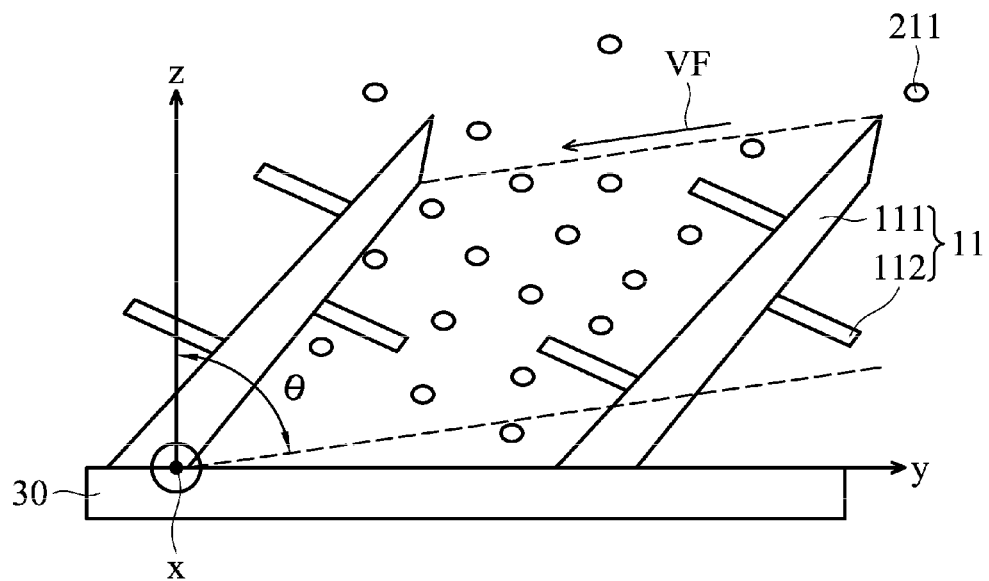
FIG. 1B is a schematic side view showing the relationship between the ITO nano-whisker structure and the liquid crystal alignment direction.
Figure 1C:
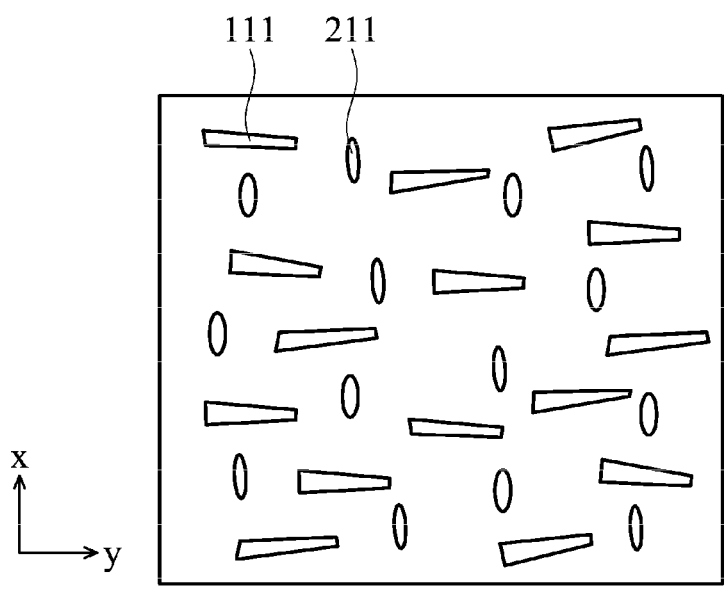
FIG. 1C is a schematic plan view showing the relationship between the ITO nano-whisker structure and the liquid crystal alignment direction.

FIG. 1A is a perspective view of an ITO nano-whisker structure observed by an electron microscope. FIG. 1B is a schematic side view showing the relationship between the ITO nano-whisker structure and the liquid crystal alignment direction. FIG. 1C is a schematic plan view showing the relationship between the ITO nano-whisker structure and the liquid crystal alignment direction.

To obtain materials which are conductive and transparent, and have the ability to align liquid crystal molecules, the invention performs glancing angle deposition to form a 3-dimensional indium-tin-oxide (ITO) nano-whisker structure. As shown in FIG. 1A, the structure includes a plurality of nano-whiskers 11, and each nano-whisker 11 is constructed by a main column 111 and a plurality of small branches 112 extending from the main column 111. Depending on the deposition angle, the main columns 111 of the plurality of nano-whiskers 11 tilt in a particular direction as a whole. The "tilt direction" recited in the invention refers to the average tilt direction of the plurality of nano-whiskers 11. In fact, according to several factors in the formation procedure, the tilt directions of the nano-whiskers 11 have individual differences.

As shown in FIG. 1B, assuming that a vapor source supplies a vapor flux FX along a direction which has an angle $\theta$ (hereafter, this angle $\theta$ is called a deposition angle for convenience) with respect to the normal direction (the z axis) of a substrate 30, a plurality of condensation nuclei are formed on the surface of the substrate 30 and those condensation nucleus develop into tilted rods due to their shadowing effect. After the oblique deposition, those tilted rods are exactly the nano-whiskers 11. The main columns 111 of the nano-whiskers 11 tilt in a particular direction from the x-y plane of the substrate 30 as a whole. When liquid crystal molecules 211 are injected to the surface of the substrate 30, the alignment direction of the liquid crystal molecules 211 is controlled in a direction which is perpendicular to the tilt direction of the main columns 111 of the nano-whiskers 11 (in FIG. 1B, the direction is normal to the paper). When the substrate 30 is viewed along the z axis, as shown in FIG. 1C, in the case where the nano-whiskers 11 extend in the y direction, the liquid crystal molecules 211 are aligned in the x direction, which is perpendicular to the y direction.

According to the embodiment, the ITO nano-whisker structure can be used to align liquid crystal molecules. Because the ITO nano-whisker structure is formed by a non-contact method, i.e. glancing angle deposition, shortcomings such as dust pollution, static electricity damage, brush defects, internal stress, etc can be avoided. Therefore, the ITO nano-whisker structure can be applied in subtle high-precision elements.

Next, other characteristics of the ITO nano-whisker structure will be described. ITO is a transparent (high transmittance) and conductive material, which is usually used to make electrodes in visible-light optoelectronic devices. However, it is not appropriate to apply the conventional ITO thin film in optoelectronic elements operated in the terahertz band (0.1~10 THz) which is lower than the visible-light band. Terahertz waves have been widely used in fields of radio astronomy, remote sensing, military affairs, medical imaging, etc. It is important to find materials suitable to make electrodes of the terahertz band optoelectronic elements. The ITO nano-whisker structure described above is exactly an appropriate choice to be used as the electrodes of the terahertz band optoelectronic elements.

In the following scenario, a phase shifter is used as an example of a basic liquid crystal electronic device. A phase shifter includes an upper substrate, a lower substrate, a liquid crystal layer sandwiched between the two substrates, and a pair of electrode layers which are formed on the inner surfaces of the upper and lower substrates. When a voltage is applied to the pair of electrode layers, the strength and direction of the electric field generated by the electrode layers can control the alignment direction of the liquid crystal molecules in the liquid crystal layer. Because liquid crystal molecules are birefringent materials, the alignment of the liquid crystal molecules can adjust the phase of passing light.

Figure 2A:
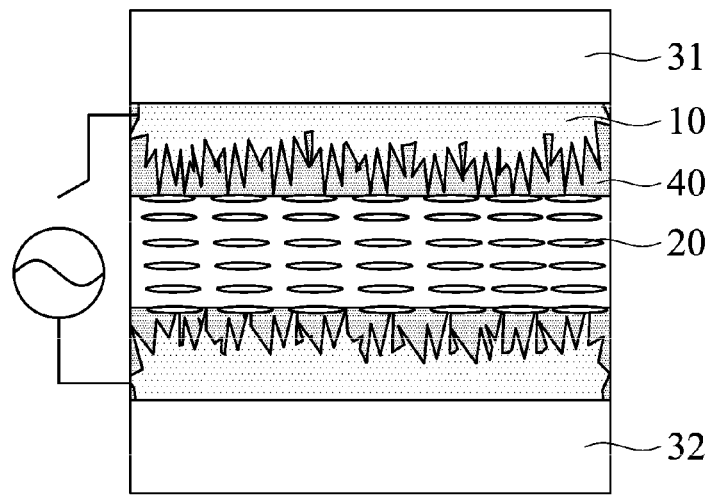
FIG. 2A is diagram showing a phase shifter which uses the ITO nano-whisker structure as electrodes in accordance with an embodiment of the invention.
Figure 2B:
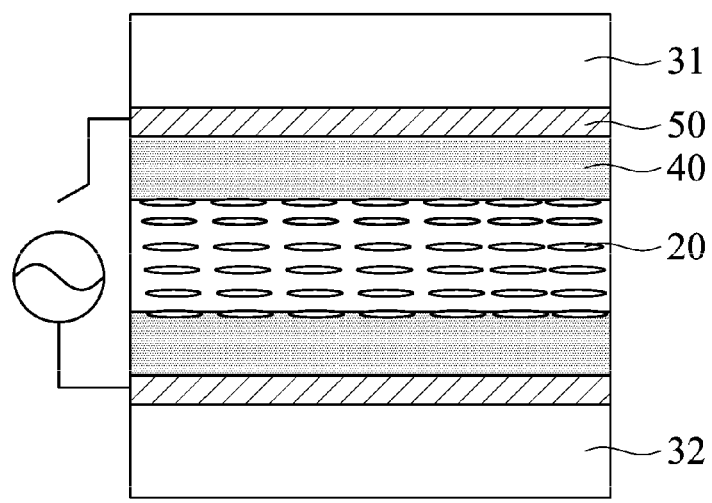
FIG. 2B is a diagram showing a phase shifter which uses conventional ITO thin films as electrodes.

FIG. 2A is diagram showing a phase shifter which uses the ITO nano-whisker structure as electrodes in accordance with an embodiment of the invention. FIG. 2B is a diagram showing a phase shifter which uses conventional ITO thin films as electrodes. In FIG. 2A, the phase shifter uses, for example, a 1008 μm thick upper substrate 31 and a 1008 μm thick lower substrate 31. A 509 μm thick liquid crystal layer is injected between the upper and lower substrates. The thickness of the liquid crystal layer of this phase shifter is much greater than the thickness of the liquid crystal layer in optoelectronic devices operated in other bands, because terahertz band optoelectronic devices need a long optic path to modulate phase. The ITO nano-whisker structure is formed on the inner surfaces of the upper and lower substrates 31, 32 as electrodes (ITO nano-whisker structured electrode 10) by the glancing angle deposition with a deposition angle ranging from 40° to 80°. In this case, the ITO nano-whisker structure is not yet used as alignment layers, so alignment agents (polyimide) 40 are still applied on the ITO nano-whisker structured electrode 10 and the liquid crystal molecules of the liquid crystal layer 20 are aligned by rubbing. In the phase shifter shown in FIG. 2B, a 200 nm thick conventional ITO film replaces the ITO nano-whisker structure to make the electrode (ITO thin film electrode 50). The other structures are the same as those shown in FIG. 2A.

Figure 3:
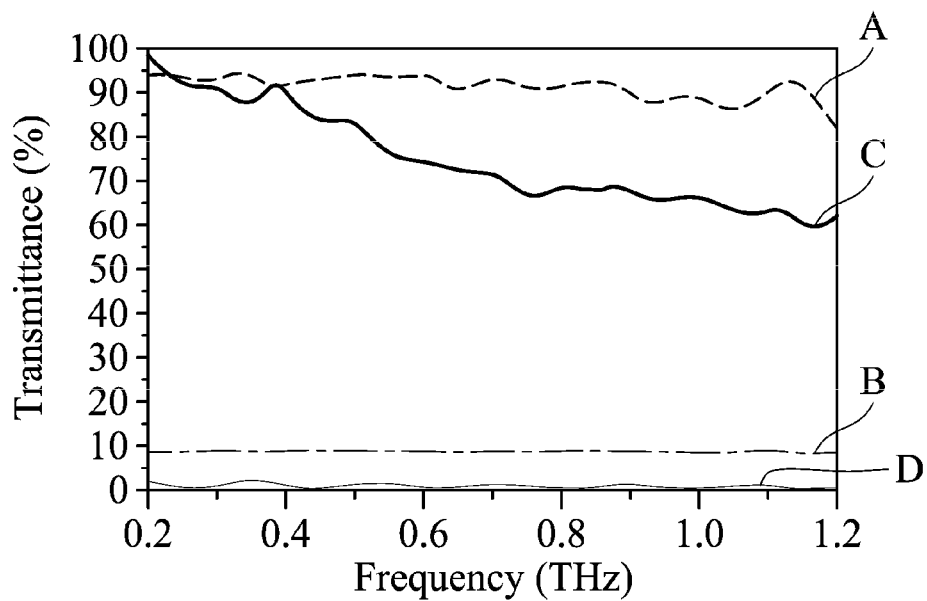
FIG. 3 is a diagram showing transmittances in the terahertz band of an ITO nano-whisker structure, an ITO thin film, a phase shifter using the ITO nano-whisker structure as electrodes, and a phase shifter using the ITO thin film as electrodes.

FIG. 3 is a diagram showing transmittances in the terahertz band of an ITO nano-whisker structure, an ITO thin film, a phase shifter using the ITO nano-whisker structured electrodes 10, and a phase shifter using the ITO thin film electrodes 50. In FIG. 3, curve A is the transmittance in the terahertz band of an ITO nano-whisker structure. The average is 91.48%. Curve B is the transmittance in the terahertz band of an ITO thin film. The average is only 8.62%. Curve C is the transmittance in the terahertz band of a phase shifter using the ITO nano-whisker structured electrodes 10 (double layers of the ITO nano-whisker structures are included). The average can reach 75.43%. Curve D is the transmittance in the terahertz band of a phase shifter using the ITO thin film electrodes 50 (double layers of the ITO thin films are included). The average is merely 0.92%.

According to these results, the ITO nano-whisker structure has high transmittance, so it is more suitable than the ITO thin film to make the electrodes of the terahertz band optoelectronic device. The reason is that the density of the ITO nano-whisker structure gradually changes from high to low along the direction that points outward from the substrate, and therefore the refractive index of the material also changes slowly. In comparison with an ITO thin film that changes its refractive index suddenly, the ITO nano-whisker structure can substantially increase light transmittance.

In addition, in order to prevent a decrease of transmittance due to the ITO thin film used as the electrodes of the terahertz band optoelectronic device, the conventional techniques include adopting side electrodes or using sub-wavelength metal grating to make a transparent electrode. However, the two methods need an extremely high bias voltage (at least 100 volts) to achieve enough retardation. Furthermore, there is a conventional technique using a magnetic field to control the alignment of the liquid crystal molecules, but the equipment to generate magnetic fields is very huge and has a complicated structure.

Figure 4:
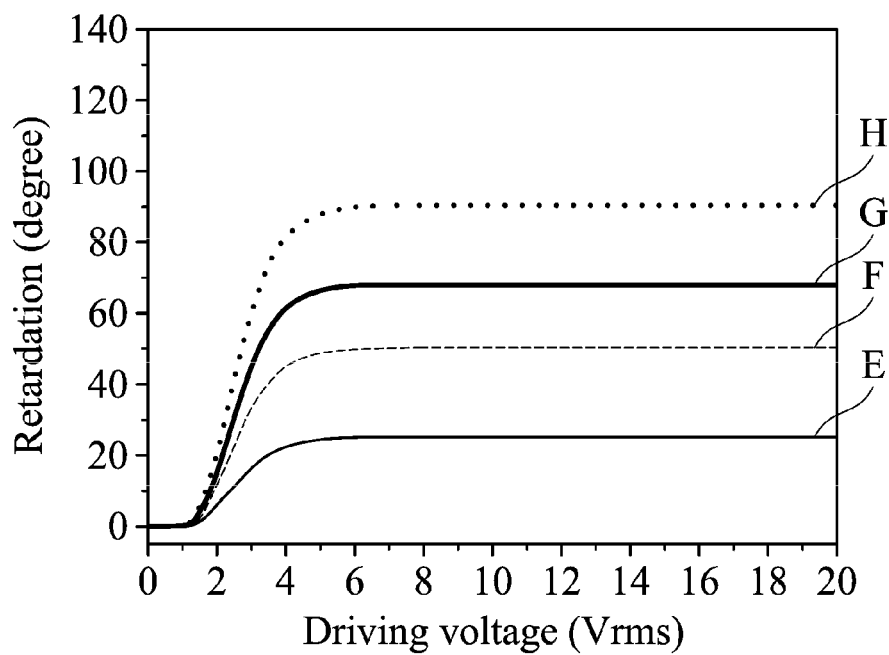
FIG. 4 is a diagram showing voltage-retardation curves when a phase shifter which uses the ITO nano-whisker structured electrodes is operated at different frequencies in the terahertz band.

In contrast, using the ITO nano-whisker structure as electrodes of the terahertz band optoelectronic device has the advantages of a low driving voltage, a simple structure, and being easy to fabricate. FIG. 4 is a diagram showing voltage-retardation curves when a phase shifter which uses the ITO nano-whisker structured electrodes 10 is operated at different frequencies in the terahertz band. In FIG. 4, curves E, F, G, and H are voltage-retardation fitting curves at 0.32 THz, 0.61 THz, 0.82 THz, and 1.05 THz, respectively. From the curve H (1.05 THz), it can be understood that $\pi/2$ retardation can be reached under a low driving voltage (about 17.68 Vrms). Therefore, a ¼ wavelength phase shifter can be obtained.

Finally, the two characteristics of the ITO nano-whisker structure are both utilized: forming electrodes and aligning liquid crystal molecules. An embodiment will be described wherein the ITO nano-whisker structure is used as the electrodes and the liquid crystal alignment layers of a terahertz band optoelectronic device.

Figure 5A:
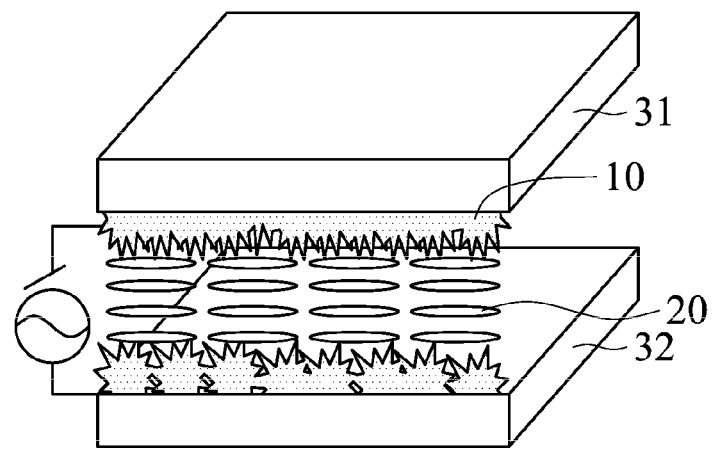
FIG. 5A is diagram showing a phase shifter which uses the ITO nano-whisker structure as electrodes and alignment layers in accordance with an embodiment of the invention.
Figure 5B:
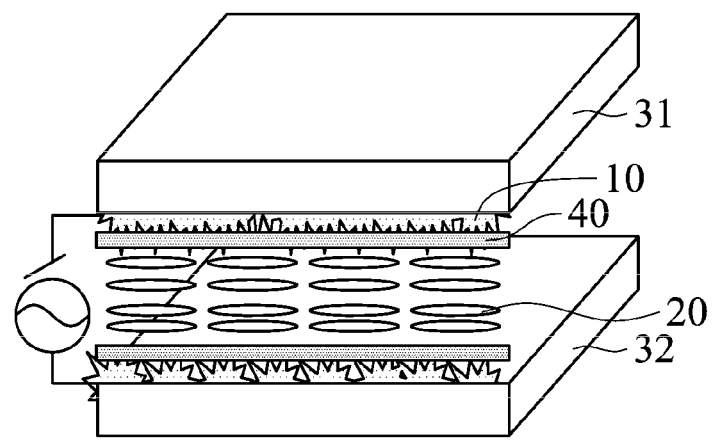
FIG. 5B is diagram showing a phase shifter which uses the ITO nano-whisker structured electrodes with an alignment agent.

FIG. 5A is diagram showing a phase shifter which uses the ITO nano-whisker structure as electrodes and alignment layers in accordance with an embodiment of the invention. FIG. 5B is diagram showing a phase shifter which uses the ITO nano-whisker structured electrodes with an alignment agent. In FIGS. 5A and 5B, the upper and lower substrate 31, 32 (the thickness of each is 1008 μm), the liquid crystal layer 20 (the thickness is 509 μm), and the ITO nano-whisker structured electrode (the thickness is 600~1400 nm and the deposition angle of the glancing angle deposition is 40~80°) are the same size as those shown in FIGS. 2A and 2B. Actually, the structure of FIG. 5B is the same as the structure of FIG. 2A. The difference between FIG. 5A and FIG. 5B is that the ITO nano-whisker structure shown in FIG. 5A plays the roles of an electrode and an alignment layer at the same time, so the process of applying polyimide 40 and rubbing it for alignment is omitted. When the bright (or dark) states of the phase shifter shown in FIG. 5A and FIG. 5B are observed by a microscope, it can be observed that the alignment effect is slightly poorer when the ITO nano-whisker structure is used as the electrode and the alignment layer but generally speaking both of these two cases can obtain an extremely high contrast.

Figure 6:
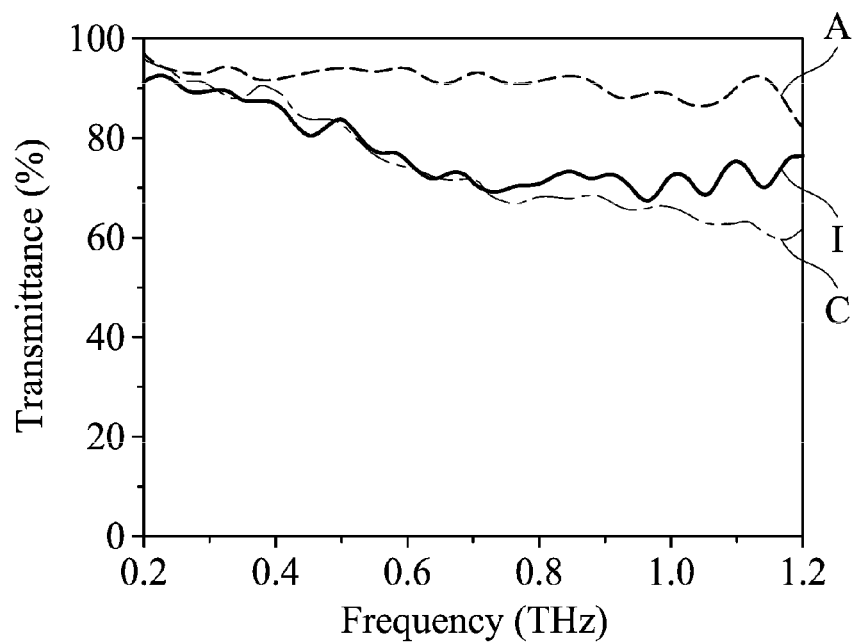
FIG. 6 is a diagram showing transmittances in the terahertz band of an ITO nano-whisker structure, a phase shifter using the ITO nano-whisker structured electrodes with an alignment agent, and a phase shifter using the ITO nano-whisker structured electrodes without an alignment agent.

FIG. 6 is a diagram showing transmittances in the terahertz band of an ITO nano-whisker structure, a phase shifter using the ITO nano-whisker structured electrodes 10 with the polyimide 40, and a phase shifter using the ITO nano-whisker structured electrodes 10 without the polyimide 40. In FIG. 6, curve A is the transmittance in the terahertz band of an ITO nano-whisker structure. The average is 91.48%. Curve C is the transmittance in the terahertz band of a phase shifter using the ITO nano-whisker structured electrodes 10 with the polyimide 40. The average is 75.43%. Curve I is the transmittance in the terahertz band of a phase shifter using the ITO nano-whisker structured electrodes 10 without the polyimide 40. As shown in FIG. 6, at low frequencies the curve I where the polyimide 40 is not used is approximately the same as the curve C where the polyimide 40 is used, but at high frequencies the curve I has obviously higher transmittance that the curve C.

Figure 7:
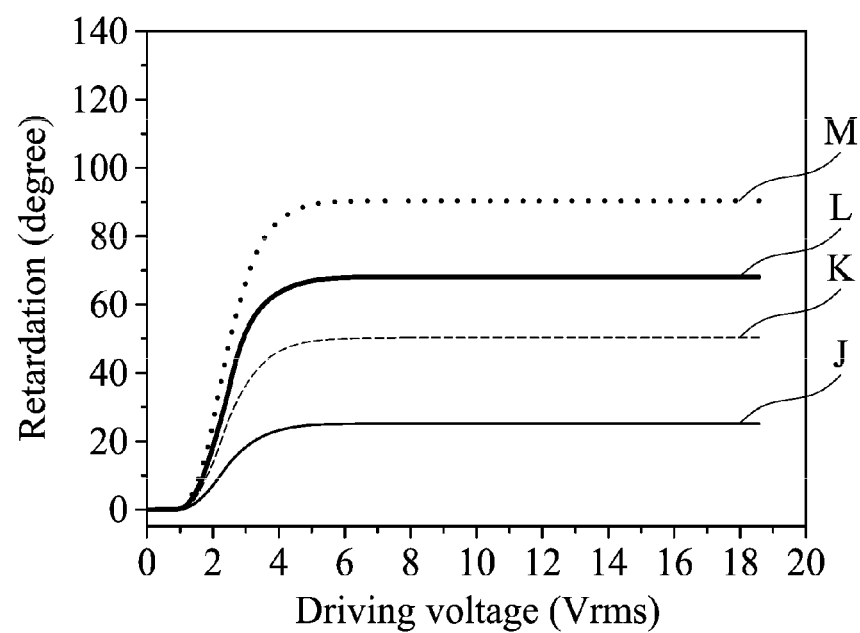
FIG. 7 is a diagram showing voltage-retardation curves when a phase shifter which uses the ITO nano-whisker structure as electrodes and alignment layers is operated at different frequencies in the terahertz band.

FIG. 7 is a diagram showing voltage-retardation curves when a phase shifter which uses the ITO nano-whisker structure as electrodes and alignment layers is operated at different frequencies in the terahertz band. In FIG. 7, curves J, K, L, and M are voltage-retardation fitting curves at 0.32 THz, 0.61 THz, 0.82 THz, and 1.05 THz, respectively. From the curve M (1.05 THz), it can be understood that $\pi/2$ retardation can be reached under very low driving voltage (about 2.83 Vrms). In comparison with the curve H (shown in FIG. 4) where the polyimide 40 is used under the same condition, the driving voltage has been substantially lowered in the curve M. Therefore, a ¼ wavelength phase shifter which is operated under the lowest driving voltage can be obtained.

According to the above embodiments, the invention provides a liquid crystal based optoelectronic device which uses an ITO nano-whisker structure as electrodes and alignment layers. The ITO nano-whisker structured electrode of the liquid crystal based optoelectronic device has the advantages of high transmittance and low driving voltage in the terahertz band. When the ITO nano-whisker structured electrode is used as an alignment layer at the same time, the shortcomings of contact-type alignment methods, such as dust pollution, static electricity damage, brush defects, internal stress, etc can be avoided. Therefore, the ITO nano-whisker structured electrode/alignment layer can be applied to subtle high-precision elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). For example, the terahertz band optoelectronic device which uses the ITO nano-whisker structured electrodes is described, but the visible light band optoelectronic device can also utilize this structure. Furthermore, the invention uses a phase shifter to represent a liquid crystal based optoelectronic device, but the liquid crystal based optoelectronic device can be any other device, such as a liquid crystal display device. Therefore, the scope of the appended claims should be accorded the broadest interpretation so as to encompass all such modifications and similar arrangements.

What is claimed is:
1. A liquid crystal based optoelectronic device, comprising
    an upper substrate and a lower substrate,
    a liquid crystal layer sandwiched between the upper substrate and the lower substrate, and
    a pair of indium-tin-oxide (ITO) nano-whisker layers respectively formed on the inner surfaces of the upper substrate and the lower substrate, wherein each nano-whisker layer comprises a plurality of whiskers, and each whisker comprises a main column and a plurality of branches extending from the main column;

wherein the ITO nano-whisker layers are alignment layers for aligning liquid crystal molecules in the liquid crystal layer.

2. The liquid crystal based optoelectronic device as claimed in claim 1, wherein a tilt direction of the main columns of the plurality of whiskers extends in a first direction in a plane of the upper substrate or the lower substrate as a whole so as to align a longitudinal dimension of the liquid crystal molecules in a second direction which is perpendicular to the first direction.

3. The liquid crystal based optoelectronic device as claimed in claim 1, wherein the ITO nano-whisker layers are used as a transparent electrode for driving the tilt direction of the liquid crystal molecules.

4. The liquid crystal based optoelectronic device as claimed in claim 3, wherein the liquid crystal based optoelectronic device is utilized in the terahertz band (0.1~10 THz).

5. The liquid crystal based optoelectronic device as claimed in claim 1, wherein the liquid crystal based optoelectronic device is utilized in the visible light band.

6. The liquid crystal based optoelectronic device as claimed in claim 5, wherein the liquid crystal based optoelectronic device is utilized in a display apparatus.

7. The liquid crystal based optoelectronic device as claimed in claim 1, wherein the thicknesses of the ITO nano-whisker layers are 600 nm~1400 nm.

8. The liquid crystal based optoelectronic device as claimed in claim 1, wherein the ITO nano-whisker layers are formed by glancing angle deposition, wherein an angle between a vapor flux direction and the normal direction of the substrate where the vapor is deposited is 40°~80°.

* * * * *